United States Patent [19]

Jabara

[11] Patent Number: 5,246,151
[45] Date of Patent: Sep. 21, 1993

[54] COMPARTMENT ORGANIZER FOR AUXILIARY COMPARTMENT OF A VEHICLE

[76] Inventor: Luke D. Jabara, 7869 Esmond Rd., Hale, Mich. 48739

[21] Appl. No.: 797,044

[22] Filed: Nov. 25, 1991

[51] Int. Cl.⁵ .................. B60R 7/04; B65D 21/02
[52] U.S. Cl. .................. 224/42.42; 224/42.01; 224/42.38; 220/23.83; 220/505; 220/523; 220/528; 220/529; 248/205.2; 248/206.3
[58] Field of Search ........... 224/42.42, 42.01, 42.32, 224/42.38; 248/205.2, 206.2, 206.3; 220/23.83, 505, 523, 528, 529

[56] References Cited

U.S. PATENT DOCUMENTS

| | | | |
|---|---|---|---|
| 3,630,343 | 12/1971 | Wohl | 224/42.42 X |
| 3,804,233 | 4/1974 | Gregg, Jr. | 224/42.32 |
| 4,809,897 | 3/1989 | Wright, Jr. | 224/282 |
| 4,821,931 | 4/1989 | Johnson | 224/42.42 |
| 4,848,627 | 7/1989 | Maeda et al. | 224/275 |
| 4,915,275 | 4/1990 | Brown | 224/42.42 |
| 5,007,569 | 4/1991 | Zarb | 224/275 |
| 5,029,787 | 7/1991 | Florentin | 248/206.3 |
| 5,038,982 | 8/1991 | Salveson | 224/42.11 |
| 5,065,922 | 11/1991 | Harris | 224/42.32 |
| 5,094,375 | 3/1992 | Wright | 224/42.42 |

Primary Examiner—Allan N. Shoap
Assistant Examiner—Vanessa Caretto
Attorney, Agent, or Firm—Gifford, Groh, Sprinkle, Patmore and Anderson

[57] ABSTRACT

An organization device for use with a storage compartment of a vehicle is disclosed. The organization device has a base member having legs which have notches or scoring for adjusting the length of the legs. The legs have removable mounting feet. The mounting feet are provided with suction cups to secure the base member within the storage compartment. The base member supports a tray having receptacles formed to transport specific items, such as tape cassettes, litter and beverages. The tray may be provided with removable and interchangeable receptacles.

10 Claims, 2 Drawing Sheets

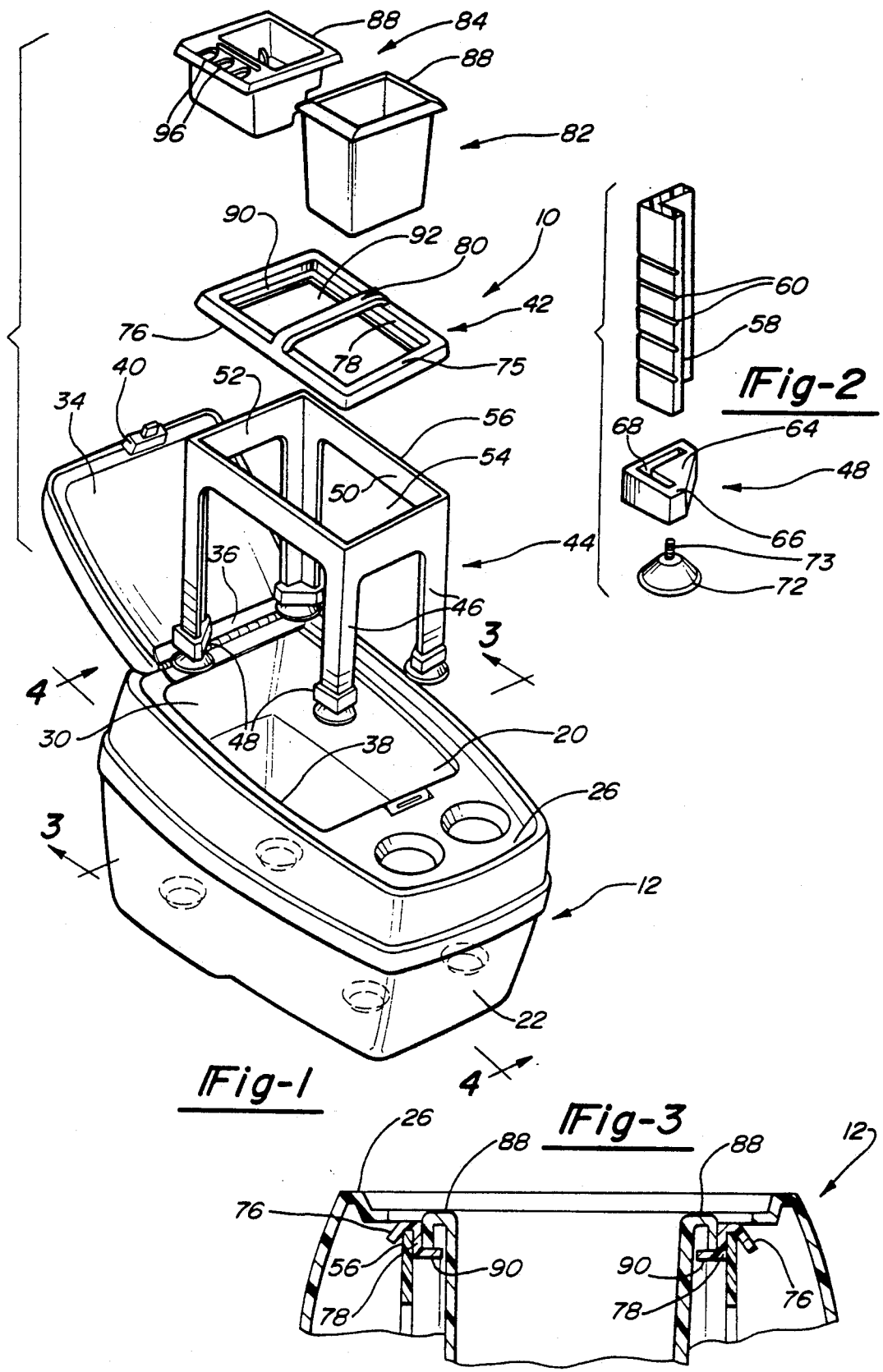

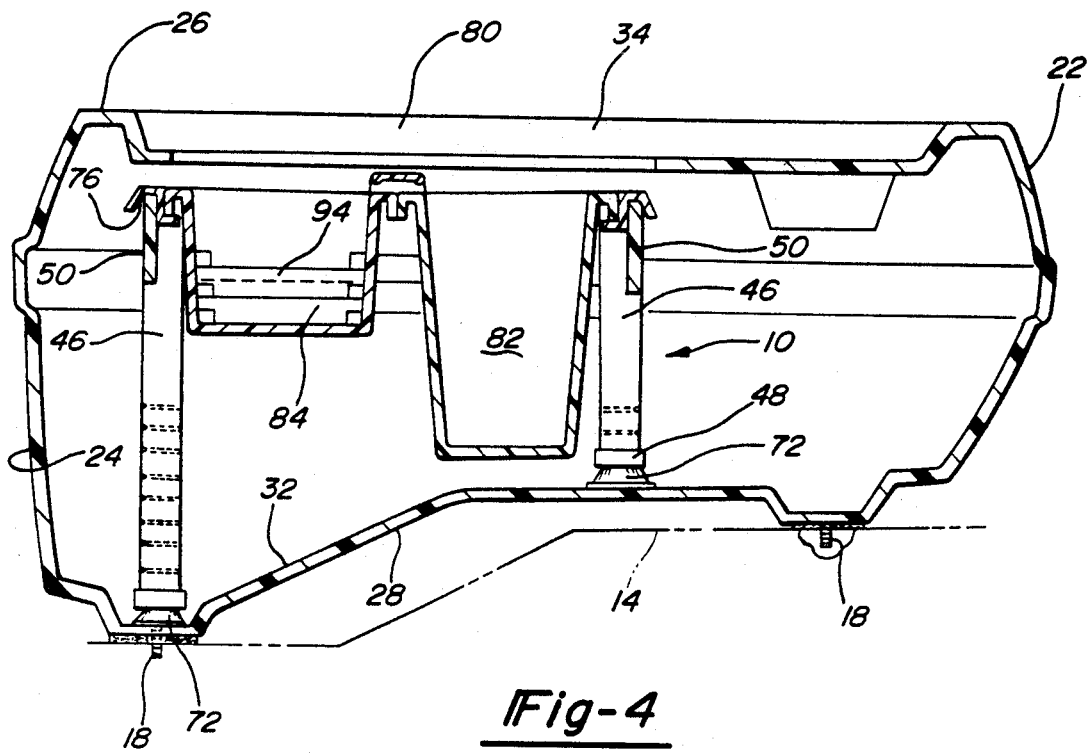
Fig-4
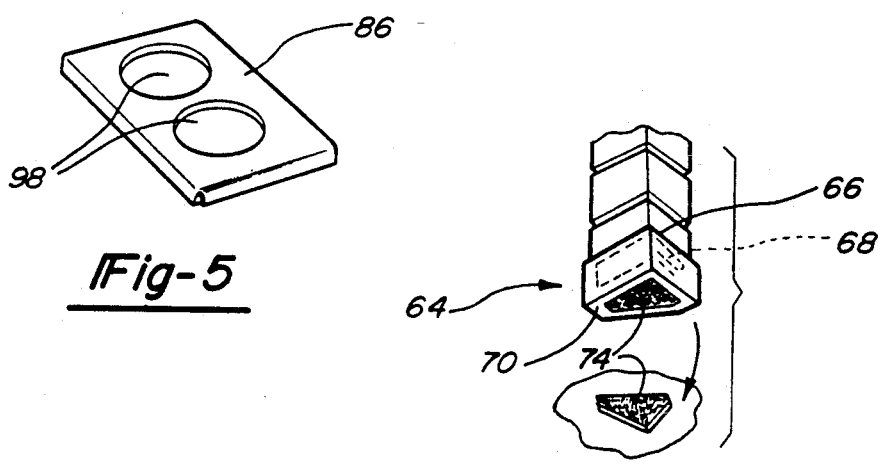
Fig-5
Fig-6

COMPARTMENT ORGANIZER FOR AUXILIARY COMPARTMENT OF A VEHICLE

BACKGROUND OF THE INVENTION

I. Field of the Invention

This invention relates to an organizer for an auxiliary storage compartment, in particular, for storage compartments in vehicles.

II. Description of the Prior Art

Many vehicles, such as off road vehicles or 4×4's, have limited enclosed storage room. Such vehicles are frequently provided with a storage compartment to hold items such as maps, writing instruments, coins, beverage containers, cassette tapes, small tools, tokens, and the like. The storage compartment is frequently sold as an accessory and is mounted on the center of the floor of the vehicle over the transmission housing and ahead of the front seat.

Generally, these storage compartments are in the shape of a rectangular box having a door. The door is hinged upwardly to provide access to an interior cavity of the compartment. However, because of the volume of the interior of the compartment, the items which are typically carried in such compartments are free to move about within the compartment. Thus, it would be desirable to provide a device on which the items to be transported are compartmentalized.

Devices for organizing materials stored in a vehicle are known are devices adapted to be fixed on the dashboard of an automobile. Typically, these devices have compartments for holding coins and the like, and have means for mounting the storage device to a dashboard of the vehicle. Likewise, having devices which are adapted to ride on the hump extending over the transmission housing are known. These devices are adapted to extend over the hump and are typically provided with compartments for small items and holders for beverage containers.

However, none of these devices is suited for use with the above mentioned storage compartments. These compartments typically have floors which are shaped to mate with the contour of the hump over the transmission housing. The storage compartments are dimensioned to adopt to particular models of vehicles and therefore the dimensions of the storage compartments vary. Consequently, the size and shape of the interior chamber of the storage compartments differ greatly. Thus, it is an object of the invention to provide an organizing compartment which is adaptable for use in a wide range of storage compartments. It is a further object of the invention to provide a storage compartment which makes efficient use of the interior space as well as accommodate the items to be carried inside.

SUMMARY OF THE INVENTION

The present invention provides a device for organization and transportation of different items in an accessory storage compartment of a vehicle. The organizer device is provided with a base member having means for removably supporting a tray and having four downwardly extending legs. Each of the legs is scored or notched so that the length of the legs can be easily adjusted to support the tray in a horizontal alignment. Affixed to the bottom of each leg is a mounting foot having a mounting device, such as a suction cup, for securing the base member to the bottom of the storage compartment.

The tray has a handle for facilitating removal of the compartment and a plurality of interchangeable receptacles for receiving material to be stored. These receptacles may be formed to store specific items and changed according to the needs of the user. Thus, disclosed is a device which is adaptable for use in organizing and transporting items in the storage compartment of a vehicle.

In an alternative embodiment, the mounting feet are dimensioned so as to extend from the legs to the side walls of the compartment to position the base within the cavity of the storage compartment.

BRIEF DESCRIPTION OF THE DRAWINGS

These and other objects and advantages of the invention will be more fully apparent from the following description, made in connection with the accompanying drawings, wherein like reference characters refer to the same or similar parts throughout the several views, and in which:

FIG. 1 is an exploded perspective view of the organizer device according to the invention showing the device suitable for use with a storage compartment;

FIG. 2 is a fragmentary perspective view of a leg of a base member and a mounting foot according to the invention;

FIG. 3 is a fragmentary sectional view taken along lines 3—3 of FIG. 1 of a portion of the tray and base member of the organizing device in the storage compartment;

FIG. 4 is a sectional view taken along lines 4—4 of FIG. 1 showing an organizer device in position in a storage compartment of a vehicle;

FIG. 5 is a perspective view of an interchangeable receptacle suited for beverage containers; and FIG. 6 is an perspective view of an alternative embodiment of a mounting foot according to the invention.

DESCRIPTION OF THE PREFERRED EMBODIMENTS

Shown in FIG. 1 is an organizer device 10 for use in a frequently provided as accessories for vehicles having limited interior storage space. The storage compartments are typically used for storage of a variety of items commonly carried in vehicles, including cassette tapes, small tools, coins, maps, litter, beverages, etc. and other materials.

As shown in FIG. 4, the storage compartment 12 is mounted to the floor 14 of a vehicle. The storage compartment 12 is generally mounted over a rear portion of a transmission housing with conventional fasteners such as bolts 18. The storage compartment is generally rectangular in shape, having a pair of side walls 20, a front wall 22, a rear wall 24, a top 26 and a bottom 28 defining an interior chamber 30.

The bottom 28 has an interior surface 32 which is typically sloped or stepped to correspond to the shape of the floor 14 of the vehicle where the storage compartment 12 is mounted. The floor 14 of the vehicle is typically stepped or sloped in a direction downwardly from the front wall 22 to the rear wall 24 in order to mate with the floor 14 of the vehicle over the transmission housing.

Mounted to the top 26 of the compartment 12 is a door 34. The door 34 is mounted with a hinge 36 to pivot upwardly to provide access to the interior chamber 30 through an opening 38 in the top 26. Typically, the door 34 has a lock 40 to secure the door 34 to the compartment 12.

As best shown in FIG. 1, the organizer device 10 includes a tray 42 removably supported on a base member 44. The base member 44 has four L-shaped legs 46 extending downwardly to mounting feet 48. The mounting feet 48 are provided to secure the base member within the interior chamber 30 of the storage compartment.

The base member 44 has two pair of parallel sides 50 and 52 joined at the corners to define an opening 54. The two pair of parallel sides 50 and 52 have a top surface formed to support the tray 42 as set forth more fully below. Extending from each corner of the base is one of the four legs 46. The base member 44 is preferably formed of a molded material, such as fiberglass or rigid plastic.

As shown in FIG. 2, each leg 46 has a lower end 58 having a plurality of spaced apart and parallel indentations or notches 60. The notches 60 are sufficiently deep to permit cutting of the leg with a knife or pair of cutters. In this way, the length of the legs can be shortened to permit the base and tray to fit fully within the interior cavity 30 of the storage compartment as shown in FIG. 4. Because the interior surface is sloped, it may be necessary to adjust the length of the legs independently to maintain the tray 42 along a generally horizontal plane after it is positioned in the storage chamber. As best shown in FIG. 2, each mounting foot 48 is formed from a block 64 of a solid material such as hard rubber. Each mounting foot 48 has a top surface 66 having an L-shaped slot 68 formed to accept the lower end 58 of the leg 46. The slot 68 is dimensioned to frictionally engage the lower end 58 of the leg. In this way, the mounting foot 48 is removable from the legs to permit adjustment of length of the legs. After the length of the legs have been adjusted, the mounting feet are replaceable by pushing the lower end 58 of the legs into the slot 68.

Extending from a lower surface 70 of the block 64 is a mounting device. In the preferred embodiment, the mounting device is a suction cup 72 mounted in a conventional means, such as a bolt 73, threaded into the block. The suction cup 72 is provided to permit fixation of the base member 44 to the inner surface 32 of the bottom of the storage compartment. Alternatively, as shown in FIG. 6, other mounting devices such as strips 74 of hook and loop fabric known as Velcro (R) may be used. Likewise, the feet may be secured with bolts which extend through the bottom of the storage compartment.

As shown in FIG. 1, the tray 42 for carrying items has an upper surface 75 and a peripheral flange 76 extending from a side surface 78. The peripheral flange 76 is formed to mate with the top surface 50 of the base member 44. The side surface 78 of the tray is formed to be received within the pairs of sides 52 and 54 of the base member to hold the tray in position in the base. A handle 80 extends from the upper surface to permit the user to lift up the tray 42 to permit access to a lower portion of the storage compartment.

The tray 42 is formed with receptacles for items to be stored. Although the receptacles may be formed integrally with the tray 42, in the preferred embodiment, a number of specialized receptacles such as a litter bin 82, and cassette tape holder 84, as shown in FIG. 1, and a beverage container holder 86, as shown in FIG. 5. Each receptacle is dimensioned to be supported by a flange 88 engaging a lip 90 of the tray. the lip 90 defines a central opening 92.

As shown in FIG. 1, the litter bin 82 is a box having an open top. The tape cassette holder 84 has a plurality of laterally extending walls 94 spaced apart to hold tape cassettes. The tape cassette holder may be provided with coin holders 96 which are dimensioned to hold stacks of like coins.

As shown in FIG. 5, the beverage container holder has a pair of apertures 98 for accepting a glass or can. This receptacle may be used in place of either the litter bin 82 or cassette tape holder 84. Alternatively, receptacles formed to accommodate specific items such as pens, maps, flashlights, etc. may be formed for use with the tray. In this way, the user of the vehicle may select the receptacles suited to carry the items which the user wishes to store.

It will be realized that other changes may be made in the form, details and arrangement of the portion of the parts of the assembly without departing from the scope of the invention which consists of the structure as shown and described herein and as set forth in the appended claims.

What is claimed is:

1. An organization device for storage of items in a compartment of a vehicle, said compartment having a bottom surface, said device comprising:
 a tray having at least one receptacle for storing items;
 a base member having a plurality of legs and means for removably supporting said tray, said means for supporting including a support surface defining an aperture, said plurality of legs each having a length extending from said support surface to a distal end portion, said support surface supporting said at least one receptacle in said aperture and in a spaced apart relationship from said bottom surface;
 means for securing said base member within said compartment; and
 means for independently adjusting said length of each of said plurality of legs extending between said bottom surface and said distal end of each of said plurality of legs, whereby said support surface is maintained in a generally horizontal plane.

2. The organization device of claim 1, wherein said means for securing said base comprises a plurality of mounting feet associated with respective ones of said plurality of legs, each of said plurality of feet having means for detachable mounting to said distal end of each of said plurality of legs.

3. The organization device of claim 2, wherein each of said mounting feet has means for engaging an inner surface of said compartment to secure said base member within said compartment.

4. The organization device of claim 3, wherein said means for engaging further comprises a pair of straps having hook and loop projections extending for meshing engagement with each other.

5. The organization device of claim 3, wherein said means for engaging further comprises a suction cup.

6. The organization device of claim 1, wherein the means for adjusting a length of the legs further comprises a plurality of spaced apart parallel notches formed in a bottom end of each of said legs.

7. The organization device of claim 1, wherein said tray further comprises a flat surface disposed to engage said means for removably supporting said tray.

8. The organization device of claim 1, wherein said at least one receptacle comprises a removable receptacle having a peripheral flange.

9. The organization device of claim 1, wherein said tray further comprises a lip for supporting said at least one receptacle.

10. The organizational device of claim 1, wherein said at least one receptacle is supported in said aperture to extend downwardly between said plurality of legs.

* * * * *